Figure 1:
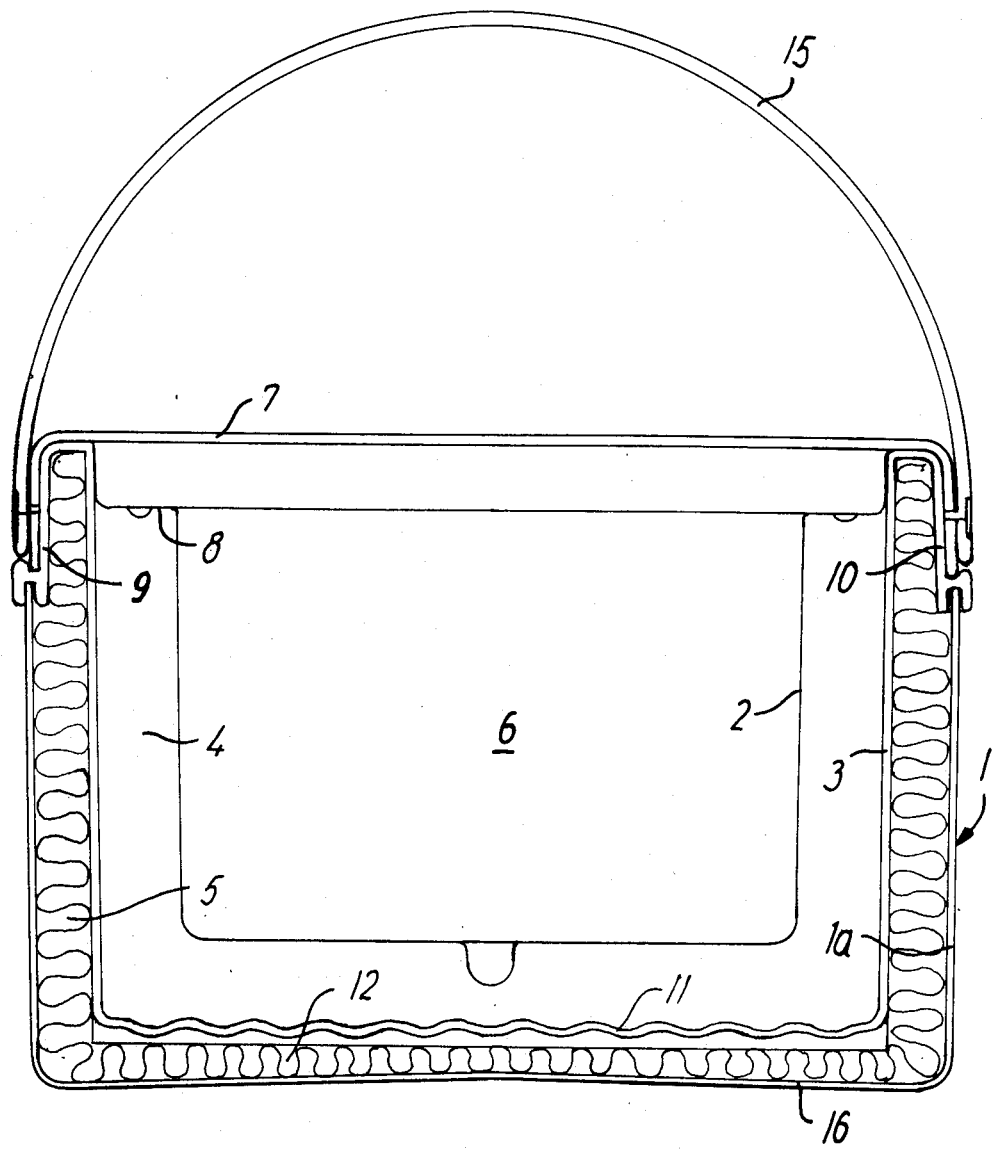

United States Patent [19]

Baek

[11] Patent Number: 4,688,398
[45] Date of Patent: Aug. 25, 1987

[54] THERMO-FREEZING CONTAINER, IN PARTICULAR FOR A MACHINE FOR THE PRODUCTION OF FROZEN DESSERTS

[75] Inventor: Poul E. Baek, Ringkobing, Denmark

[73] Assignee: P. E. Baek Holding APS, Denmark

[21] Appl. No.: 933,348

[22] Filed: Nov. 19, 1986

Related U.S. Application Data

[63] Continuation of Ser. No. 800,078, filed as PCT DK85/00021 on Feb. 27, 1985, published as WO85/03998 on Sep. 12, 1985, abandoned.

[30] Foreign Application Priority Data

Feb. 29, 1984 [DK] Denmark .............................. 1299/84
Jul. 18, 1984 [DK] Denmark .............................. 3516/84

[51] Int. Cl.⁴ .............................................. A23G 9/00
[52] U.S. Cl. ........................................ 62/342; 62/457; 62/529; 62/DIG. 13
[58] Field of Search ................ 62/529, 530, 342, 457, 62/372, 430, DIG. 13; 165/81, 104

[56] References Cited

U.S. PATENT DOCUMENTS

| | | | |
|---|---|---|---|
| 2,039,736 | 5/1936 | Munters et al. | 62/457 |
| 2,809,498 | 8/1955 | Allen | 62/342 |
| 3,780,536 | 12/1973 | Fishman et al. | 62/342 |
| 3,807,194 | 4/1974 | Bond | 62/371 X |
| 3,914,956 | 10/1975 | Knight | 62/343 |
| 3,921,961 | 11/1975 | Hapgood | 62/457 X |
| 4,179,904 | 12/1979 | McClenny | 62/342 |
| 4,205,535 | 6/1980 | Maurer | 62/342 |
| 4,332,485 | 6/1982 | Woodman | 62/136 X |
| 4,392,361 | 7/1983 | Cavalli | 62/343 |
| 4,488,817 | 12/1984 | Uesaka et al. | 62/342 X |

FOREIGN PATENT DOCUMENTS

| | | |
|---|---|---|
| 868267 | 8/1978 | Belgium . |
| 3422163A1 | 12/1984 | Fed. Rep. of Germany . |
| 1452299 | 9/1966 | France . |
| 2472347 | 12/1979 | France . |
| 2486773 | 7/1980 | France . |
| 1032859 | 6/1966 | United Kingdom . |
| 1440759 | 6/1976 | United Kingdom . |

Primary Examiner—William E. Wayner
Attorney, Agent, or Firm—Stevens, Davis, Miller & Mosher

[57] ABSTRACT

A freezing container comprising an inner bowl for containing a product to be frozen, an outer bowl sealed and containing an expandable freezing agent and insulation around the outer bowl. The bottom wall of the outer bowl is relatively resilient so as to take up for expansion of the freezing agent and is spaced from the outer insulation layer.

5 Claims, 2 Drawing Figures

THERMO-FREEZING CONTAINER, IN PARTICULAR FOR A MACHINE FOR THE PRODUCTION OF FROZEN DESSERTS

This application is a continuation of application Ser. No. 800,078, filed as PCT DK85/00021 on Feb. 27, 1985, published as WO85/03998 on Sep. 12, 1985, now abandoned.

This invention relates to a thermo-freezing container, in particular to be used in a machine for the production of frozen desserts, comprising an outer bowl, a heat conducting inner bowl firmly connected with the outer bowl, an intermediate bowl positioned between the outer bowl and the inner bowl and forming together with the inner bowl an uninterrupted closed cavity adapted to receive a freeze agent, and a bowl-shaped insulation core positioned between the intermediate bowl and the outer bowl.

Containers of this kind are used for storing and transportation of frozen products, e.g. as an ice cube bucket or as a transport container for frozen articles of food or other products.

From U.S. Pat. No. 2,039,739, a thermo-freezing container for storing frozen or cooled-down foods is known, in which the inner bowl and the intermediate bowl constitute a container detachable from the outer bowl and which may be provided with resilient walls to permit expansion or contraction of the freeze agent, so that these loads therefrom do not give rise to cracking of the container. When in use, the intermediate bowl is closely encircled by the outer bowl, so that the deformation of the freeze agent container by expansion of the freeze agent is effected towards the interior of the container.

In another thermo-freezing container of the above mentioned kind, disclosed in U.S. Pat. No. 3,807,194, the inner bowl, the intermediate bowl and the outer bowl are in firm connection and are provided with walls of plastics and with a view to thermal conductivity, the inner bowl facing the internal container space is formed with a small thickness and corrugations to increase the rigidity and the heat transmission area. Also in this case, expansion of the freeze agent will cause deformation exclusively of the inner bowl.

It is the object of the invention to provide a thermo-freezing container of the kind mentioned, in which expansion of the freeze agent may take place without deformation of the inner bowl, whereby the container besides fulfilling the above mentioned purpose becomes particularly suitable for use as a freezing container in a machine for the home-making of frozen desserts, for instance ice cream, comprising e.g. a motor driven stirring member disposed in the internal container space and having scrapers in contact with the inner bowl.

With this object in mind, a thermo-freezing container according to the invention is characterized in that the inner bowl is made of a comparatively rigid material, while the intermediate bowl is provided with at least one locally resilient area to take up the expansion of the freeze agent, the insulation core opposite said resilient area being spaced apart from the intermediate bowl.

Figure 2:
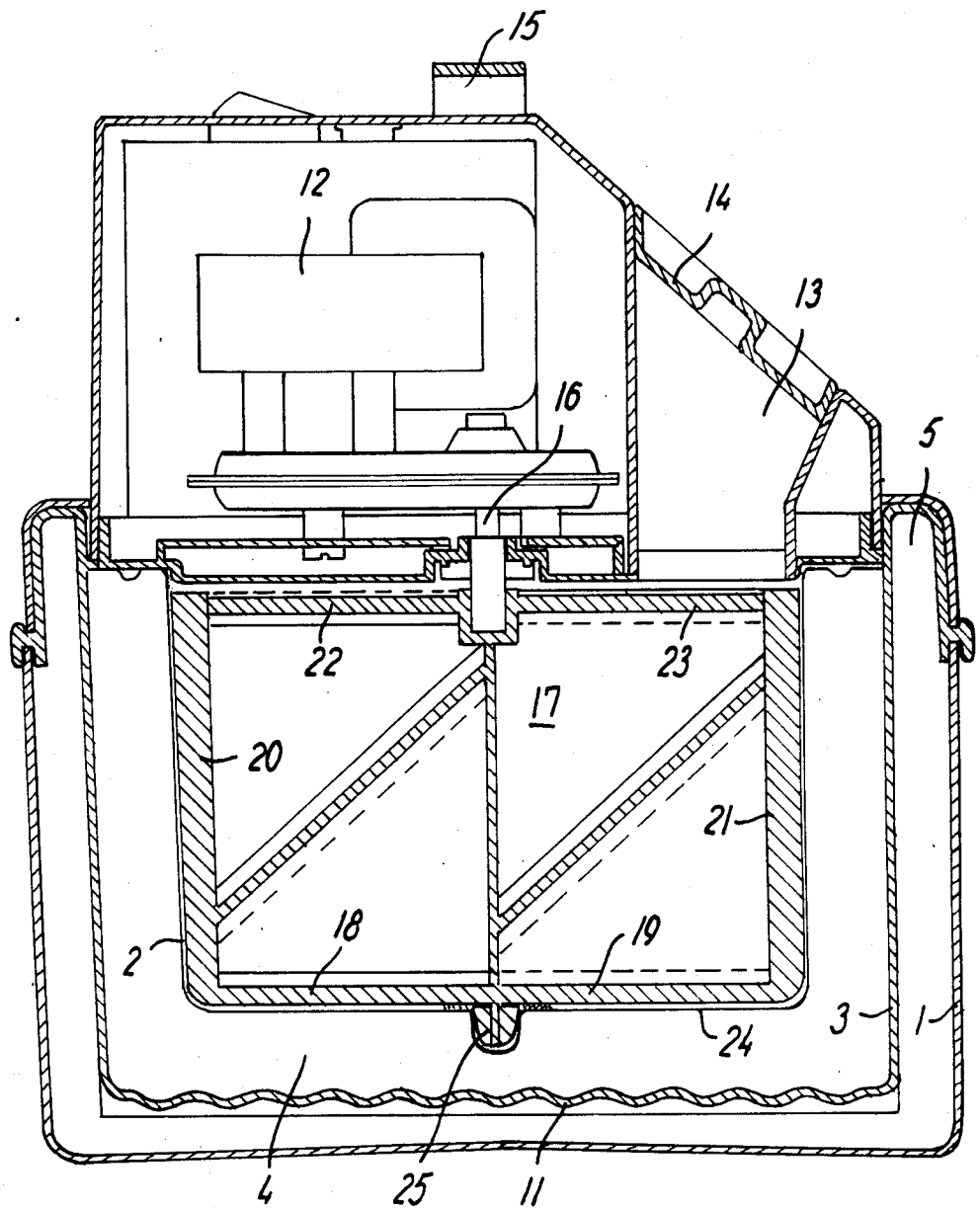

The invention will be more fully explained in the following with reference to the schematical drawings, in which FIG. 1 illustrates an embodiment of a thermofreezing container according to the invention, and FIG. 2 illustrates the container shown in FIG. 1 used in a machine for the home-making of ice cream.

The thermo-freezing container illustrated in FIG. 1 comprises an outer bowl 1 with a circular-cylindrical side wall 1a and a bottom 1b, an inner bowl 2 disposed in the outer bowl 1 and being firmly connected therewith, and an intermediate bowl 3 which together with the inner bowl 2 form a cavity 4 adapted to receive a freeze agent. A bowl-shaped insulation core 5 is positioned between the intermediate bowl 3 and the outer bowl 1. The container thus provided forms a circular-cylindrical space 6 adapted to receive a product to be stored or transported when frozen, or to be subjected to freezing in the container.

The container may be closed by a cover 7 which is substantially made from heat insulating material. The intermediate bowl 3 forms at its top a support for the cover.

The outer bowl 1 may be constituted by lateral walls 1a and a bottom 1b of a comparatively rigid impact resistant plastics material, e.g. ABS plastic, while the insulation core 5 may, for instance, be made from polystyrene.

The inner bowl is made from a rigid heat conducting material, e.g. stainless steel or aluminum, of a thickness of e.g. 0.8 mm, so as to obtain a good heat transmission contact between the freeze agent in the cavity 4 and the internal container space 6, on one hand, and a high resistance towards mechanical influences, as well as ease of cleaning, on the other hand. The intermediate bowl 3 is provided, at its top, with a pendent skirt 9 for connection with the upper edge of the circular-cylindrical side wall 1a of the outer container 1, for instance by gluing, and may be made from the same material as the outer bowl 1.

Above the rim 8, the inner bowl 2 is correspondingly provided with a pendent skirt 10 that follows the skirt 9 of the intermediate bowl 3 and is glued thereto in order to obtain a sealed confinement of the freeze agent in the space 5.

According to the invention, the intermediate bowl 3 is provided with a locally resilient area to take up the expansion of the freeze agent when subjected to freezing, which in the illustrated embodiment is obtained in that the bottom 11 of the intermediate bowl 3 is wave-shaped. In order to make room for the deformation of the bottom 11 caused by the expansion of the freeze agent, the bottom portion 12 of the insulation core 5 located opposite the bottom 11 is withdrawn from the wave-shaped bottom 11 of the intermediate bowl 3.

With this structure, a localization of the wall deformation caused by the expansion of the freeze agent to the bottom 11 of the intermediate bowl 3 will be obtained, while the inner bowl 2 is not subjected to deformation. In order to reduce the tendency of deformation, the volume of the freeze agent in the cavity 4 may, in addition, be somewhat smaller than the volume of the cavity.

The thermo-freezing container illustrated in FIG. 1 can be used for storage and/or transportation in a cold or frozen state of an arbitrary product, for which a storage is desired, e.g. a food stuff or a pharmaceutical product. As the loss of cold to the surroundings is very low, the container is suitable for storing frozen products for a longer period of time up to 11 hours, for instance as an ice cube bucket.

In FIG. 2, the thermo-freezing container illustrated in FIG. 1 is shown when used in connection with a machine for the home-making of frozen desserts, e.g. ice cream, comprising a motor housing 12 adapted to be mounted upon the thermo-freezing container instead of its usual cover 7, the motor housing being supported on a rim 8 formed by the top of the inner bowl 2. The motor housing 12 may, as shown, be provided with a filling opening 13, which during the use of the machine may be closed by a cap 14 and be secured to the thermo-freezing container in that the container is provided with a handle 15 which, when pivoted up over the motor housing 12, secures said housing to the thermo-freezing container.

A stirring member 17 is secured to an outlet shaft 16 from an electromotor disposed in the motor housing, said stirring member being provided with scrapers 18 to 23, which during the rotation of the stirring member scrape off the frozen product from the inner bowl and, moreover, effect a mixing and, in case of a product like soft ice, a swelling of the product. The bottom 24 of the inner bowl 2 is provided with a central depression 25 to receive a central pin at the bottom of the stirring member.

The thermo-freezing container according to the invention can be used in a manner known per se, so that prior to use it is positioned without the cover or motor housing in a freezer for a period of time sufficiently long to freeze the freeze agent in the cavity 4. The integral design of the container with the cavity 4 for the freeze agent and the insulation core 5 being in firm connection causes a minimum loss of cold when removing a product from the freezer, and when used in connection with an ice machine, the home-making of ice cream outside the freezer may take place in a very short time of production.

I claim:

1. A thermo-freezing container, in particular to be used in a machine for the production of frozen desserts, said machine including a motor-driven stirring member to be positioned in said container to perform a rotary movement therein, said container comprising an outer bowl; an inner bowl; and intermediate bowl between the outer bowl and the inner bowl and forming together with the inner bowl an uninterrupted closed cavity adapted to contain a freeze agent; a bowl-shaped insulation core positioned between the intermediate bowl and the outer bowl; the inner bowl being made more rigid than the intermediate bowl, so that the latter will take up any expansion of the freeze agent; the inner bowl being made of a heat conducting material and being firmly connected with the intermediate bowl, the outer bowl and the insulation core to form one unit assembly to be positioned in a freezer for freezing the freeze agent, the intermediate bowl being formed with a resilient bottom to confine deformation caused by expansion of the freeze agent to said bottom, the insulation core opposite said bottom being spaced apart from the intermediate bowl.

2. A thermo-freezing container as claimed in claim 1, characterized in that said bottom (11) is wave-shaped.

3. A thermo-freezing container as claimed in claim 1, characterized in that the bottom (24) of the inner bowl (2) is provided with a central depression (25) as a guide for a stirring member (17) rotatable in the inner bowl (2).

4. A thermo-freezing container as claimed in claim 1, characterized in that the inner bowl (2) forms a rim (8) at its top for support of a motor housing (12) for a stirring member (17).

5. A thermo-freezing container as claimed in claim 4, characterized in that a handle (5) connected with the container is adapted to fasten said motor housing (12) to the container.

* * * * *